United States Patent [19]

Lindner et al.

[11] Patent Number: 5,026,803
[45] Date of Patent: Jun. 25, 1991

[54] CROSSLINKED TRIAZINE POLYMERS AND THEIR USE AS CROSSLINKING AGENTS

[75] Inventors: Christian Lindner, Cologne; Karl-Erwin Piejko, Bergisch Gladbach, both of Fed. Rep. of Germany

[73] Assignee: Bayer Aktiengesellschaft, Leverkusen, Fed. Rep. of Germany

[21] Appl. No.: 542,822

[22] Filed: Jun. 25, 1990

[30] Foreign Application Priority Data

Jul. 8, 1989 [DE] Fed. Rep. of Germany ....... 3922498

[51] Int. Cl.$^5$ ............... C08F 226/06; C08F 222/06; C08F 218/02; C08F 212/06
[52] U.S. Cl. ............................ 526/261; 526/271; 526/330; 526/342; 526/347
[58] Field of Search ........................................ 526/261

[56] References Cited

U.S. PATENT DOCUMENTS 3,049,517  8/1962  Caton ................................. 526/261

OTHER PUBLICATIONS

Paul M. Elliott, Heat-Resistant Copolymer of Triallyl Cyanurate and a Maleic Alkyd, Modern Plastics, Jul. 1952, pp. 113–114 and 185–187.

*Primary Examiner*—Joseph L. Schofer
*Assistant Examiner*—Wu C. Cheng
*Attorney, Agent, or Firm*—Connolly and Hutz

[57] ABSTRACT

The invention relates to crosslinked polymers based on triazines of the general formula I

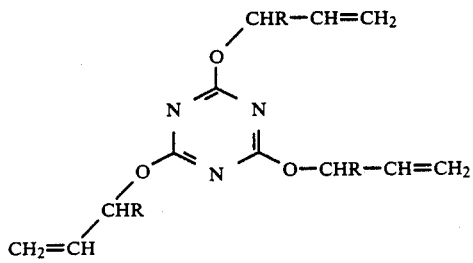

wherein
R denotes hydrogen, $CH_3$ or $C_2H_5$, and
at least one vinylmonomer.

The polymers are suitable as crosslinking agents for the preparation of duromers or elastomers.

2 Claims, No Drawings

CROSSLINKED TRIAZINE POLYMERS AND THEIR USE AS CROSSLINKING AGENTS

The invention relates to crosslinked polymers based on triazines. The polymers are suitable for the preparation of duromers or elastomers and lead to the formation of a heterogeneous network in these materials.

Crosslinked polymers (for example duromers) are an important class of plastics and are distinguished from uncrosslinked polymers (for example thermoplastics) by particular properties (for example hardness or heat distortion resistance).

Crosslinked polymers can be obtained, on the one hand, by curing uncrosslinked polymers which contain structural elements capable of undergoing crosslinking. On the other hand, crosslinked products are obtained directly if crosslinking agents are added during the preparation of the polymers themselves.

Known crosslinking agents for polymers which undergo curing initiated by free radicals are, for example, polyfunctional vinyl or allyl monomers or relatively high molecular weight unsaturated, soluble polymers (for example unsaturated polyesters).

Thus, the publications German Offenlegungsschrift 2,256,301 and EP-A-50 265 describe the addition of small amounts of polyallyl compound as a crosslinking agent for the preparation of thermoplastics having a high impact strength.

Surprisingly, it has been found that crosslinked polymers based on triazines and having a high content of triazines can themselves act as crosslinking agents.

The crosslinking density, the type of crosslinking and the size of certain areas in the polymer network can be predetermined by the crosslinked polymers according to the invention. The crosslinking of further areas of the polymer can be adjusted separately by means of the reaction conditions during the reaction of the crosslinked polymer with other monomers. It is thus possible to prepare polymers having particular network structures in a controlled manner (for example having network arc lengths which vary from area to area or a particular distribution of network arc lengths).

The invention relates to crosslinked polymers which have ethylenically unsaturated groups and an iodine number (according to Kaufmann) of 15 to 200, preferably 50 to 180, and consist of A) from 11 to 60% by weight, preferably from 20 to 50% by weight, particularly preferably from 25 to 50% by weight, of 1,3,5-triazine of the formula (I)

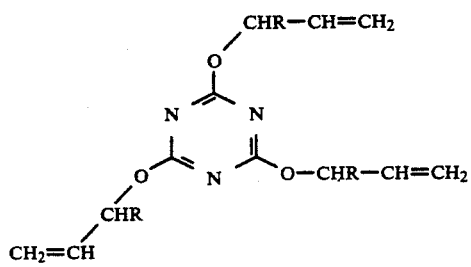

wherein
R denotes hydrogen, $CH_3$ or $C_2H_5$ and

B) from 89 to 40% by weight, preferably from 80 to 50% by weight, particularly preferably from 75 to 50% by weight, of at least one vinylmonomer.

Suitable vinylmonomers B) are preferably styrene, p-methylstyrene, halostyrene, chloromethylstyrene, α-methylstyrene, acrylonitrile, methacrylonitrile, $C_1$–$C_8$-alkyl acrylate, $C_1$–$C_8$-alkyl methacrylate, vinyl acetate, vinyl propionate, N-methylpyrrolidone, butadiene, isoprene, maleic anhydride, maleimide, vinyl chloride, acrylic acid, methacrylic acid, acrylamide and methacrylamide, styrene, $C_1$–$C_8$-alkyl acrylates, $C_1$–$C_8$-alkyl methacrylates and acrylonitrile being particularly preferred.

Preferred crosslinked polymers are obtained from triazines of the formula I and a mixture of at least two olefinically unsaturated monomers, such as styrene and acrylonitrile or styrene and $C_1$–$C_8$-alkyl acrylate or styrene and $C_1$–$C_8$-methacrylate. Particularly preferred polymers are obtained from triazines of the formula I and a mixture of at least two olefinically unsaturated monomers, such as styrene and acrylonitrile or styrene and $C_1$–$C_8$-alkyl acrylate or styrene and $C_1$–$C_8$-methacrylate having not more than 50% by weight of styrene monomers, relative to the sum of the weights of components A) and B).

The polymers according to the invention can be prepared by emulsion polymerization in a continuous or discontinuous process.

Suitable anionic emulsifiers are, for example, aliphatic, higher fatty acids, organic sulphonic acids or sulphuric acid half-esters. Suitable nonionic emulsifiers are, for example, polyethoxylated phenol derivatives or aliphatic polyethoxylated polyether block polymers.

Suitable free radical initiators are peroxides, per acids, hydroxyperoxides, persulphates, perphosphates and known redox initiators. Water-soluble inorganic solvents, such as potassium peroxodisulphate or peroxodiphosphate, are particularly suitable initiators.

The copolymerisation of the monomers A) and B) can be carried out in such a way that the conversion of the monomers to the copolymer, based on weight, is greater than or equal to 97% by weight, preferably greater than or equal to 99% by weight.

The crosslinked polymers according to the invention are highly crosslinked and have gel contents greater than 90% by weight. The polymers according to the invention may be particulate; their particle diameter ($d_{50}$) (determined by light scattering measurements) is then from 0.05 to 1 μm, preferably from 0.06 to 0.3 μm.

Because of the unsaturated character of the polymers according to the invention (incorporated ethylenically unsaturated groups), they are capable, for example, of undergoing an addition reaction with iodine. For these reasons, a good test for the content of olefin groups can be carried out by iodine titration methods. The polymers according to the invention have an iodine number (according to Kaufmann) of 15 to 200, preferably 50 to 180.

The polymers according to the invention have only one type of unsaturated structural element and, because of this special type of vinyl double bond obtained by incorporation of the monomers A), possess particular thermal stability.

The crosslinked polymers can be isolated from the emulsion, for example by coagulation with the aid of inorganic salts, acids or bases and by increasing or reducing the temperature. The polymers are obtained—after drying—generally as powders.

The polymers according to the invention can be used as crosslinking agents in free radical polymerisation.

The invention also relates to the use of the crosslinked polymers according to the invention for the preparation of crosslinked plastics.

Plastics produced using the crosslinked polymers according to the invention have advantageous shrink properties and have a better correlation of hardness, rigidity and stability when subjected to impacts similar to those encountered in practice.

For a definition and analysis of network structures (crosslinking density, network arc length), see M. Hoffmann et al. Polymeranalytik I und II (Polymer Analysis I and II), Georg Thieme Verlag, Stuttgart, 1977.

EXAMPLES 2,4,6-Tris-(2-propenyloxy)-1,3,5-triazine, abbreviated here to TAC, was used as the triazine monomer I in the Examples.

The following monomers are also used in the Examples:

| Monomer | Abbreviation |
|---|---|
| n-Butyl acrylate | nBA |
| Styrene | S |
| Acrylonitrile | ACN |
| Methyl methacrylate | MMA |

EXPERIMENTAL SERIES A)

Preparation of the copolymers

The following were initially taken in a reactor:
2000 parts by weight of water and
5 parts by weight of the Na salt of $C_{14}$–$C_{16}$-alkylsulphonic acids After heating to 70° C. and the addition of an initiator solution consisting of 5 parts by weight of potassium peroxodisulphate in 100 parts by weight of water, 1500 parts by weight of a monomer solution are added in the course of 5 hours and an emulsifier solution consisting of 1000 parts by weight of water and 25 parts by weight of the Na salt of $C_{14}$–$C_{16}$-alkylsulphonic acids is added separately. Polymerisation is then completed in the course of 4 hours at 70° C.

The following experiments (A1–A8) were carried out analogously to this method, using the monomer mixtures shown in Table 1.

TABLE 1

| Experiment No. | Composition of the monomer mixtures (parts by weight, monomer) | |
|---|---|---|
| A 1 (Comparative Experiment) | 1350 | nBA |
|  | 150 | S |
| A 2 | 1200 | nBA |
|  | 150 | S |
|  | 150 | TAC |
| A 3 | 1125 | nBA |
|  | 150 | S |
|  | 225 | TAC |
| A 4 | 1050 | nBA |
|  | 150 | S |
|  | 300 | TAC |
| A 5 | 950 | nBA |
|  | 150 | S |
|  | 400 | TAC |
| A 6 | 850 | nBA |
|  | 150 | S |
|  | 500 | TAC |
| A 7 | 750 | nBA |
|  | 150 | S |
|  | 600 | TAC |
| A 8 | 720 | S |
|  | 280 | ACN |
|  | 500 | TAC |

After the polymerisation, emulsions having a polymer solids content of 32% by weight were obtained; the median particle diameter ($d_{50}$) of the products from experiments A1 to A8 was determined by light scattering. The following results were obtained:

| Production according to Experiment No. | Median particle diameter ($d_{50}$) [nm] |
|---|---|
| A 1 | 60 |
| A 2 | 79 |
| A 3 | 72 |
| A 4 | 65 |
| A 5 | 67 |
| A 6 | 77 |
| A 7 | 70 |
| A 8 | 83 |

The products were isolated as powders by coagulation with aqueous $MgSO_4$ solution at about 70° C.

The polymers were then filtered, washed and dried. The polymers isolated had the following properties:

| Production from Experiment No. | Iodine number (according to Kaufmann) | Gel content (% by wt.) | N content (% by wt.) |
|---|---|---|---|
| A 1 | — | — | — |
| A 2 | — | 98 | 1.59 |
| A 3 | 18.8 | 97 | 2.41 |
| A 4 | 19.2 | 96 | 3.18 |
| A 5 | 32.7 | 95 | 4.28 |
| A 6 | 41.6 | 93 | 5.32 |
| A 7 | 67.8 | 91 | 6.40 |
| A 8 | 70.0 | 91 | — |

One of the striking features is the decreasing gel content of the polymers with increasing amount of TAC incorporated, indicating that the content of non-copolymerised C=C double bonds is promoted by increasing amounts of TAC—with simultaneous suppression of crosslinking. To check the copolymer composition, copolymers from Experiments A 1 to A8 were extracted for one hour in toluene and then isolated. The products obtained according to the invention had identical nitrogen contents which confirms the chemical incorporation of TAC.

EXPERIMENTAL SERIES B)

In order to use the polymer as a crosslinking agent, the polymer from Experiment No. A 5 was dispersed by ultrasonic dispersion at room temperature in methyl methacrylate (MMA). The following mixtures were produced:

| Experiment No. | Composition (parts by weight) | |
|---|---|---|
|  | MMA | A 5 |
| B 1 (Comparative Experiment) | 50 | — |
| B 2 | 50 | 0.5 |
| B 3 | 50 | 2.5 |
| B 4 | 50 | 5 |

-continued

| Experiment No. | Composition (parts by weight) | |
|---|---|---|
| | MMA | A 5 |
| B 5 | 50 | 7.5 |
| B 6 | 50 | 10 |

The milky, liquid mixtures were further investigated. 0.5% by weight of azobisisobutyronitrile was added to mixtures B 1-B 6, the mixture was degassed and polymerisation was carried out at 60° C. for 3 hours. Polymerisation was then completed in the course of 24 hours at 80° C. The polymers were treated with boiling toluene (65 ml of toluene/g) and the gel fraction was then separated off. The gel content (dry) and the swelling index (in %) of A 5 in the mixture according to the invention are shown in the Table below.

| Experiment No. | A 5 content of the starting mixture (in %) | Gel content of the final polymer (in %) | Swelling index of the gel fraction |
|---|---|---|---|
| B 1 | — | — | — |
| B 2 | 1.0 | 5.3 | not determined |
| B 3 | 4.8 | 30 | 15 |
| B 4 | 9.1 | 42 | 16 |
| B 5 | 13.0 | 59 | 15 |
| B 6 | 16.7 | 65 | 8 |

It can be seen that an increasing proportion of unsaturated polymer according to the invention in the polymerisable mixture increases the degree of crosslinking in the final polymer.

The correlation between the gel content, swelling index and crosslinking agent concentration indicates a particular network structure.

What is claimed is:

1. Crosslinked particulate polymers having ethylenically unsaturated groups, an iodine number of 15 to 200, a median particle diameter ($d_{50}$) of 0.05 to 1 μm and consisting of
   A) from 11 to 60% by weight of 2,4,6-tris-(2-propyenyloxy)-1,3-5-triazine of the formula (I)

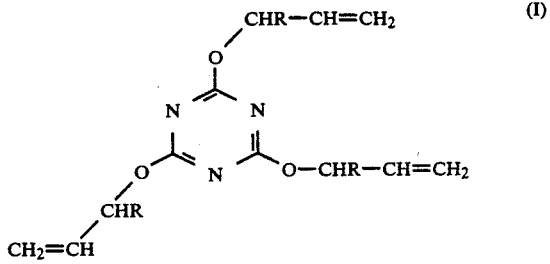

wherein
R denotes hydrogen, $CH_3$ or $C_2H_5$ and
   B) from 89 to 40% by weight of at least one vinylmonomer.

2. Polymers according to claim 1, in which styrene, p-methylstyrene, halostyrene, chloromethylstyrene, α-methylstyrene, acrylonitrile, methacrylonitrile, $C_1$-$C_8$-alkyl acrylate, $C_1$-$C_8$-alkyl methacrylate, vinyl acetate, vinyl propionate, N-methylpyrrolidone, butadiene, isoprene, maleic anhydride, maleimides, vinyl chloride, acrylic acid, methacrylic acid, acrylamide and methacrylamide are used as vinylmonomers B).

* * * * *

UNITED STATES PATENT AND TRADEMARK OFFICE
CERTIFICATE OF CORRECTION

PATENT NO. : 5,026,803
DATED : JUNE 25, 1991
INVENTOR(S) : LINDNER ET AL

It is certified that error appears in the above-identified patent and that said Letters Patent is hereby corrected as shown below:

Column 6

In claim 1, line 10, please correct the term "propyenyloxy" to read --propenyloxy--.

Signed and Sealed this

Fourteenth Day of July, 1992

Attest:

DOUGLAS B. COMER

Attesting Officer

Acting Commissioner of Patents and Trademarks